(12) United States Patent
Francisco

(10) Patent No.: US 8,096,498 B2
(45) Date of Patent: Jan. 17, 2012

(54) ROTATING AUXILIARY POWER UNIT AIR INLET DOOR

(75) Inventor: Jay M. Francisco, Chula Vista, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 454 days.

(21) Appl. No.: 11/954,620

(22) Filed: Dec. 12, 2007

(65) Prior Publication Data

US 2009/0152406 A1      Jun. 18, 2009

(51) Int. Cl.
*B64D 33/02* (2006.01)
(52) U.S. Cl. .................. 244/53 B; 244/129.5; 244/58
(58) Field of Classification Search ............... 244/129.4, 244/129.5, 58, 53 B; 137/15.1, 15.2
See application file for complete search history.

(56) References Cited

U.S. PATENT DOCUMENTS

| 6,122,575 | A | 9/2000 | Schmidt et al. |
| 6,349,899 | B1 | 2/2002 | Ralston |
| 6,735,951 | B2 | 5/2004 | Thompson |
| 6,777,822 | B1 | 8/2004 | Suttie et al. |
| 6,883,751 | B2 | 4/2005 | Koncsek |
| 7,014,144 | B2 | 3/2006 | Hein et al. |
| 7,014,145 | B2 * | 3/2006 | Bagnall ................. 244/53 B |
| 7,104,072 | B2 | 9/2006 | Thompson |
| 7,117,683 | B2 | 10/2006 | Thompson |
| 7,137,240 | B2 | 11/2006 | Thompson |
| 7,150,431 | B2 | 12/2006 | Dennis |
| 7,210,652 | B2 | 5/2007 | Hein et al. |
| 2005/0224635 | A1 * | 10/2005 | Hein et al. ................. 244/10 |

* cited by examiner

*Primary Examiner* — Tien Dinh
*Assistant Examiner* — Michael Kreiner
(74) *Attorney, Agent, or Firm* — Carlson Gaskey & Olds PC

(57) ABSTRACT

An inlet door assembly includes an inlet door rotatable about an axis of rotation.

18 Claims, 2 Drawing Sheets

ROTATING AUXILIARY POWER UNIT AIR INLET DOOR

BACKGROUND OF THE INVENTION

The present invention relates to an auxiliary power unit and more particularly to an inlet door therefore.

Aircraft auxiliary power units (APU) are gas turbine engines often located in an aircraft empennage such as an aircraft tail, fuselage wing root or fuselage wheel well area. The APU receives inlet airflow through a forward inlet silencer duct and discharges an exhaust though an acoustic muffler that is mounted to an exhaust duct of the APU to reduce noise associated therewith. The inlet typically includes a hinged door movable between three positions: a closed position, an in-flight position and a ground position.

During aircraft flight, the door extends into the free stream airflow to define a forward facing air inlet scoop. Minimizing the extent to which the door projects into the free stream airflow improves the aerodynamics of the aircraft, reduces the amount of noise that is transmitted to the cabin of the aircraft, and reduces concerns associated with the formation of ice on the door, the inlet silencer duct and plenum.

When the aircraft is on the ground, the inlet door is opened to a fully open position to compensate for the lack of free stream airflow and minimize pressure drop as a significant pressure drop may effect efficient operation of the APU. Such a fully open position, however, directs a fully open forward facing air inlet scoop toward a forward section of the aircraft such that noise may propagate therefrom. The inlet noise typically travels from the compressor through the inlet duct and is deflected from the inlet door toward the forward section of the aircraft. Since the forward section of the aircraft often include passenger doors, personnel cabins, refueling points and baggage doors, audible noise levels experienced by those onboard the aircraft or those on the ground may be increased such that the APU system will typically incorporate an inlet silencer to attenuate the APU noise and compressor tone level. Although effective, such an inlet silencer may increases weight, cost and complexity of the APU system.

SUMMARY OF THE INVENTION

An inlet door assembly according to an exemplary aspect of the present invention includes an inlet door rotatable about an axis of rotation.

A method of communicating an airflow to an auxiliary power unit according to an exemplary aspect of the present invention includes rotating an inlet door about an axis of rotation between a closed position and a ground position, an in-flight position rotationally between the closed position and the ground position, the in-flight position communicating airflow through a port in the inlet door.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
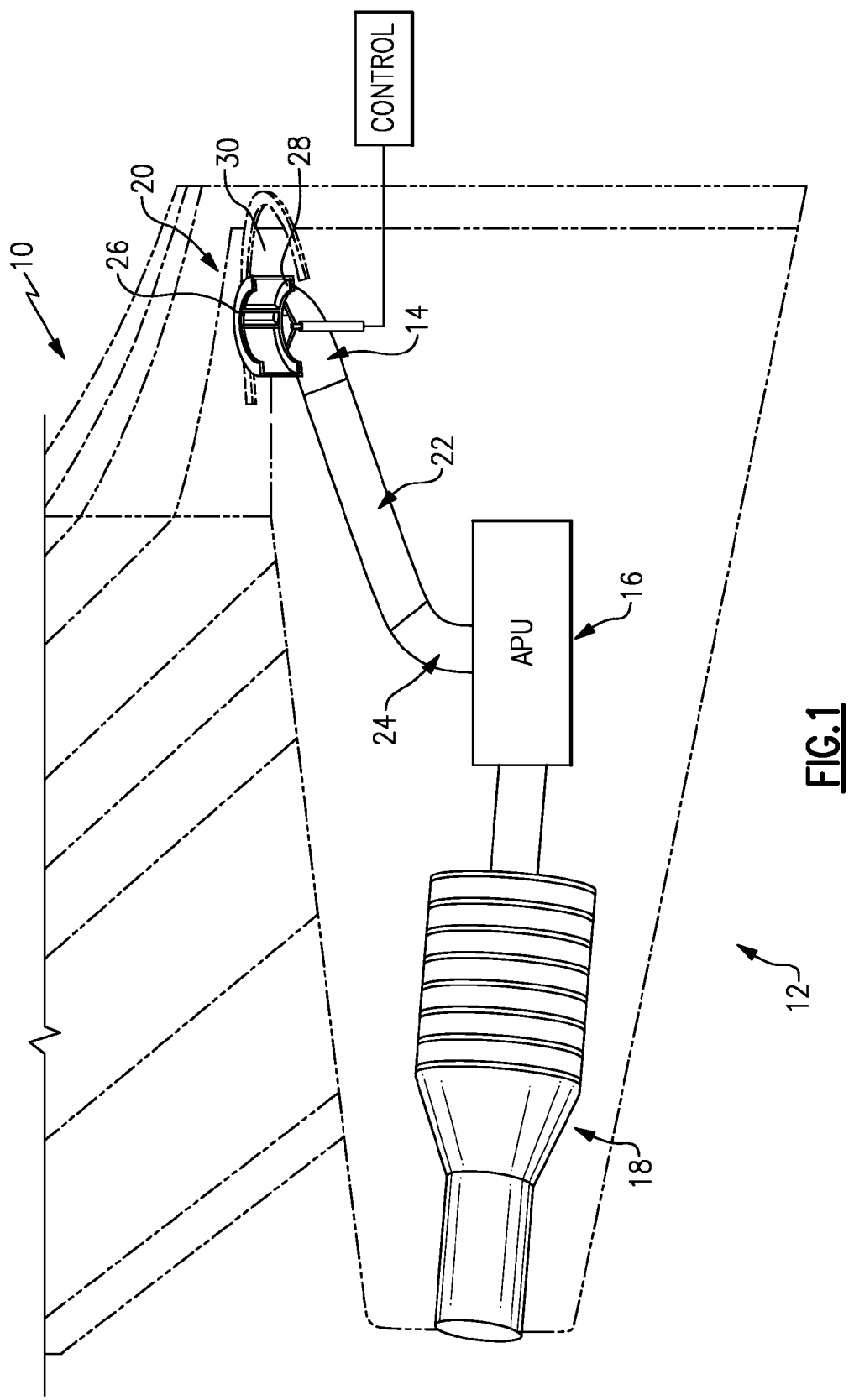
FIG. 1 is a is a cross-sectional schematic showing an auxiliary power unit (APU) mounted within an empennage of an aircraft.

FIG. 1 schematically illustrates an aircraft 10 having an auxiliary power unit (APU) system 12 mounted therein. It should be understood that although a particular empennage mounted APU system configuration is illustrate in the disclosed non-limiting embodiment, the APU system 12 may be mounted in other locations, configurations and/or machines, including aircraft and non-aircraft configurations.

The APU system 12 generally includes an APU inlet assembly 14, an APU 16 and an APU exhaust assembly 18. The APU inlet assembly 14 generally includes an inlet door assembly 20, an inlet silencer duct 22 and an inlet plenum 24 in communication with the APU 16. The inlet door assembly 20 generally includes an inlet door 26 which rotates relative an inlet door frame 28 which is attached to the aircraft skin 30.

Figure 2:
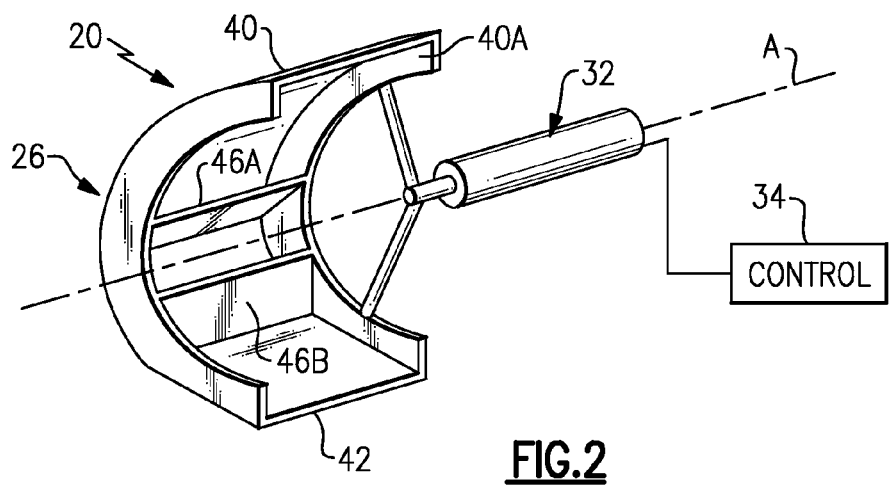
FIG. 2 is a perspective view of an inlet door assembly for an auxiliary power unit.

Referring to FIG. 2, the inlet door assembly 20 generally includes the inlet door 26 coupled to an actuator 32 for rotation of the inlet door 26 about an axis of rotation A in response to a controller 34. The actuator may be, for example, a linear, a rotary, a gear drive or other type actuator which is relatively light in weight and of an uncomplicated design as essentially no accompanying linkages are required. The controller 34 may be, for example, an APU controller, a higher level controller or other such system which operates the actuator 32 to rotationally position the inlet door 26 relative the aircraft skin 30.

Figure 3A:
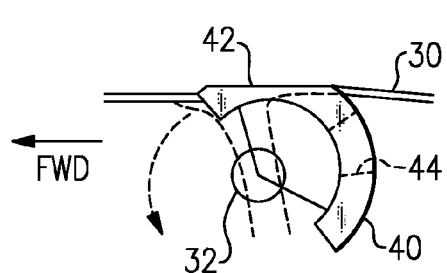
FIG. 3A is a schematic view of the inlet door in a closed position.

The inlet door 26 includes a generally arcuate outer surface 40 defined about the axis of rotation A. The generally arcuate outer surface 40 defines one end section 40A to which forms an air scoop like structure. The generally arcuate outer surface 40 transitions into a generally flat outer surface 42. The generally flat outer surface 42 may alternatively or additionally be shaped to correspond with the surface of the aircraft skin 30 when the inlet door 26 is in a closed position (FIG. 3A) to provide a low drag surface.

Figure 3B:
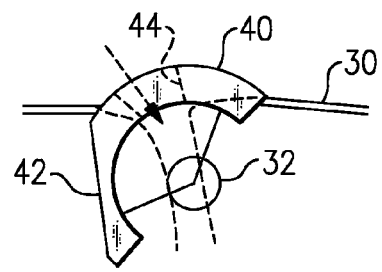
FIG. 3B is a schematic view of the inlet door in an in-flight position.
Figure 3C:
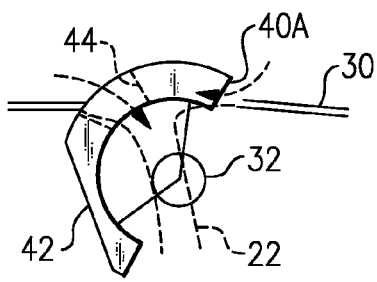
FIG. 3C is a schematic view of the inlet door in a transition position.
Figure 3D:
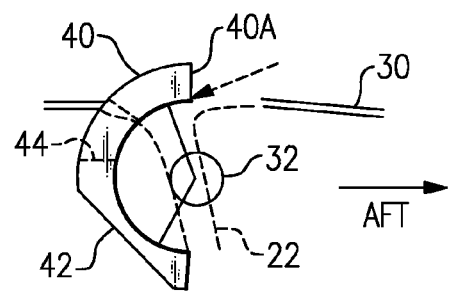
FIG. 3D is a schematic view of the inlet door in a ground position.

The inlet door 26 defines a port 44 which is sized to generally correspond with the inlet silencer duct 22. The port 44 may be defined by an inner wall structure 46A, 46B which provides for a smooth airflow therethrough. The port 44 is located through the generally arcuate outer surface 40 such that airflow may be communicated therethrough when in an in-flight position (FIG. 3B) and a transition position (FIG. 3C) during transition between the in-flight position (FIG. 3B) and a ground position (FIG. 3D).

When the inlet door 26 is rotated to the closed position (FIG. 3A), the port 44 is not open to airflow and the inlet door 26 is flush with the aircraft surface skin 30. The inlet door 26 sealingly couples to the aircraft skin 30 so that foreign objects and de icing fluid do not enter into the inlet silencer duct 22 and damage the APU.

When rotated to the in-flight position (FIG. 3B), the generally arcuate outer surface 40 forms a low drag surface which minimizes the extent to which the inlet door 26 projects into the free stream airflow. The in-flight position achieves ram air recovery while minimizing aircraft drag when the aircraft is in flight, reduces noise that is transmitted to the cabin, and reduces concerns associated with the formation of ice on the door. The port 44 is sized to generally correspond with the inlet duct 22 and provide the proper flow for in-flight operation of the APU.

When rotated to the ground position (FIG. 3D), the open end section 40A of the inlet door 26 may be directed aft. In the ground position (FIG. 3D), the port 44 is not open to airflow but the end section 40A forms a relatively large opening air scoop structure to minimize pressure drop. The inlet door 26 operates as a shield to prevent foreign objects from entering into the inlet silencer duct 22 and damaging the APU. Furthermore, as the inlet door 26 is directed aft, noise from the APU is deflected from the inlet door 26 toward the aft section of the aircraft to thereby minimize audible noise levels experienced by those onboard the aircraft or those on the ground. With the inlet door 26 deflecting the noise aft, the noise level forward may be decreased to the extent that an inlet acoustic silencer need not be required or minimized in size and length. It should be understood that the inlet door may alternatively be positioned in other directions relative the vehicle depending upon the desired configuration.

In operation, the inlet door 26 may be rotated between the closed position (FIG. 3A) and the ground position (FIG. 3D). Between the closed position (FIG. 3A) and the ground position (FIG. 3D), the in-flight position (FIG. 3B) and the transition position (FIG. 3C) provide desired airflow such that APU may be operated during transition from flight to ground operations.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An inlet door assembly for an auxiliary power unit contained within an aircraft which defines a free stream airflow direction when in flight, said inlet door assembly comprising:
    an inlet door which has a port therethrough, said inlet door rotatable about an axis of rotation transverse to a free stream airflow direction between a closed position, an in-flight position, and a ground position.

2. The assembly as recited in claim 1, wherein said inlet door includes a generally arcuate section.

3. The assembly as recited in claim 1, wherein said inlet door is generally arcuate.

4. The assembly as recited in claim 1, wherein said inlet door includes a generally arcuate outer surface.

5. The assembly as recited in claim 4, wherein said generally, arcuate outer surface defines an end section which forms a scoop in one rotational position of said inlet door to define said ground position which receives air in a direction opposite the free stream airflow direction.

6. The assembly as recited in claim 4, wherein said generally arcuate outer surface transitions into a generally flat outer surface.

7. The assembly as recited in claim 6, wherein said port is defined through said generally arcuate outer surface.

8. The assembly as recited in claim 1, further comprising an actuator which rotates said inlet door about said axis of rotation.

9. The assembly as recited in claim 8, wherein said actuator is operable to rotate said inlet door about said axis of rotation between said closed position and said ground position.

10. The assembly as recited in claim 9, wherein said actuator is operable to rotate said inlet door about said axis of rotation to said in-flight position between said closed position and said ground position.

11. The assembly as recited in claim 10, wherein said actuator is operable to rotate said inlet door about said axis of rotation to a transition position between said in-flight position and said ground position, wherein said ground position of said inlet door defines an open end section of said inlet door directed opposite the free stream airflow direction.

12. The assembly as recited in claim 1, wherein said inlet door is rotatable between a closed position and an in-flight position which allows fluid communication from the free stream airflow into the auxiliary power unit through said port.

13. An inlet door assembly for an auxiliary power unit contained within an aircraft which defines a free stream airflow direction when in flight, said inlet door assembly comprising:
    an inlet door which defines a generally arcuate outer surface, said inlet door rotatable about an axis of rotation transverse to a free stream airflow direction between a closed position, an in-flight position, and a ground position, said generally arcuate outer surface has a port therethrough to receive the free stream airflow.

14. The assembly as recited in claim 13, wherein said inlet door is rotatable about said axis of rotation between said closed position and said ground position.

15. The assembly as recited in claim 14, wherein said inlet door is rotatable about said axis of rotation to said in-flight position between said closed position and said ground position to receive the free stream airflow through said port.

16. The assembly as recited in claim 15, wherein said inlet door is rotatable about said axis of rotation to a transition position between said in-flight position and said ground position.

17. A method of communicating an airflow to an auxiliary power unit contained within an aircraft which defines a free stream airflow direction when in flight, comprising:
    rotating an inlet door about an axis of rotation transverse to a free stream airflow direction between a closed position, an in-flight position, and a ground position, the in-flight position rotationally between the closed position and the ground position for receiving airflow from the free stream airflow direction through a port through the inlet door, the ground position for receiving airflow from a direction opposite the free stream airflow direction.

18. A method as recited in claim 17, wherein said rotating step further comprises rotating the inlet door to a transition position between the in-flight position and the ground position to provide a desired airflow for auxiliary power unit operation.

* * * * *